United States Patent
Sakai et al.

(10) Patent No.: US 9,164,502 B2
(45) Date of Patent: Oct. 20, 2015

(54) CONTROL DEVICE AND CONTROL METHOD OF FIVE-AXIS CONTROL MACHINE TOOL, PROGRAM, AND MOLD

(75) Inventors: Yuichi Sakai, Yokohama (JP); Hiroki Wakayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 13/352,675

(22) Filed: Jan. 18, 2012

(65) Prior Publication Data

US 2012/0191238 A1 Jul. 26, 2012

(30) Foreign Application Priority Data

Jan. 20, 2011 (JP) ................................. 2011-009538

(51) Int. Cl.
*G06F 19/00* (2011.01)
*G05B 19/404* (2006.01)

(52) U.S. Cl.
CPC ................................... *G05B 19/404* (2013.01)

(58) Field of Classification Search
CPC ........................................................ G05B 1/00
USPC ........................................................ 700/189
See application file for complete search history.

(56) References Cited

U.S. PATENT DOCUMENTS

| | | | |
|---|---|---|---|
| 6,352,496 B1 | 3/2002 | Oldani | |
| 2001/0032056 A1 | 10/2001 | Tanaka | |
| 2002/0049514 A1 | 4/2002 | Puchtler | |
| 2009/0093905 A1* | 4/2009 | Otsuki et al. | 700/174 |
| 2009/0140684 A1* | 6/2009 | Otsuki et al. | 318/572 |

FOREIGN PATENT DOCUMENTS

| | | |
|---|---|---|
| CN | 101403906 A | 4/2009 |
| CN | 101446819 A | 6/2009 |
| JP | 4327894 B2 | 9/2009 |
| JP | 2012-164306 A | 8/2012 |

* cited by examiner

*Primary Examiner* — Mohammad Ali
*Assistant Examiner* — John Park
(74) *Attorney, Agent, or Firm* — Canon USA, Inc., IP Division

(57) ABSTRACT

A five-axis control machine tool stores rotation-axis data indicating the inclination or runouts of each of a rotation axis A of a tilting table and a rotation axis C of a rotating table in association with rotation angles determined based on NC data, and calculates a correction rotation angle of each of the rotation angles A and C to correct the erroneous attitude of a tool. Five-axis control is performed based on the NC data by rotating the tilting table and the rotating table about the rotation axes A and C at the correction rotation angles, so that a workpiece is machined while eliminating the erroneous attitude of the tool.

9 Claims, 14 Drawing Sheets

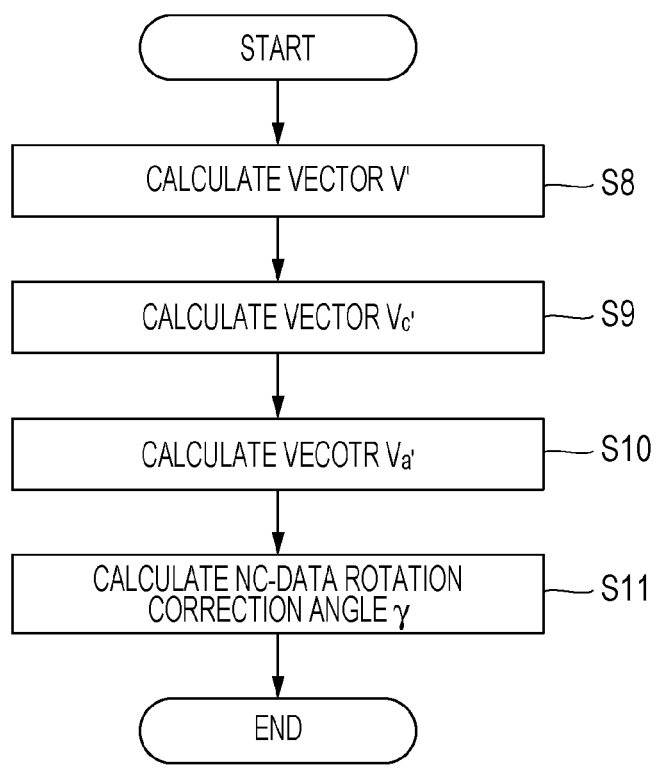

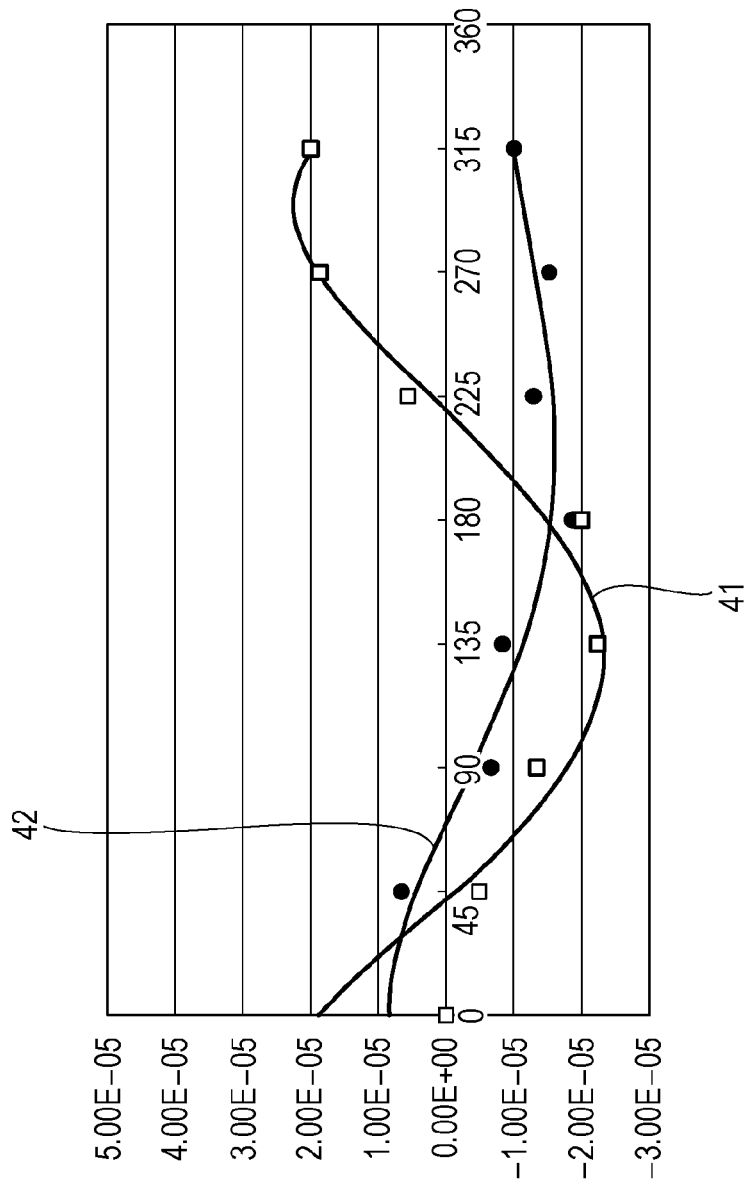

CONTROL DEVICE AND CONTROL METHOD OF FIVE-AXIS CONTROL MACHINE TOOL, PROGRAM, AND MOLD

BACKGROUND OF THE INVENTION

1. Field of the Invention

One of the aspects of the present invention relates to a control device and a control method of a five-axis control machine tool including three linear axes and two rotation axes, a program, and a mold.

2. Description of the Related Art

A five-axis control machine tool is a machine tool having two rotation axes in addition to three orthogonal linear axes. For example, the rotation axis of a tilting table is defined to be parallel to any of the three linear axes, and the rotation axis of a rotating table on the tilting table is defined to be parallel to one of the linear axes that are orthogonal to the rotation axis of the tilting table. The tilting table and the rotating table are arbitrarily rotated so that a workpiece placed on the rotating table is inclined in an arbitrary direction. As a consequence, the preparation time is decreased and the machining efficiency is increased.

In the above-described five-axis control machine tool, the rotation axes of the tilting table and the rotating table should be parallel to the linear axes. In reality, however, the rotation axes are often inclined with respect to the linear axes due to the machining errors or installation errors of the tilting table and the rotating table. Further, even though it is desirable that there are no axial runouts of the rotation axes during the rotation, the runouts are caused by the installation errors or the like. On the other hand, an NC-data generation device generates NC data based on the premise that the rotation axes of the tilting table and the rotating table are parallel to the linear axes. Therefore, the position and attitude of a workpiece in the NC data generated by the NC-data generation device may not agree with those of the workpiece which is actually placed on the five-axis control machine tool due to errors including, for example, the inclinations of the rotation axes of the tilting table and the rotating table, and the machining precision may be decreased.

Accordingly, methods for decreasing the influence of the inclination or runouts of the rotation axes on the machining precision by correcting the inclination or runouts have been proposed. For example, as disclosed in Japanese Patent No. 4327894, position-correction amounts are set for a positioning error and an inclination error dependent on the rotation-axis position, and the position-correction amounts are added to a command linear-axis position so that the tool-tip position is moved to a position free from the errors to decrease the influence of the rotation-axis error on the machining precision.

However, the rotation-axis errors including the inclination, runouts, etc. of the rotation axis cause not only the deviation of the machining position, but also the inclination of the workpiece. The inclination of the workpiece occurs not only in the horizontal direction, but also in the vertical direction. Since the method disclosed in Japanese Patent No. 4327894 corrects only the linear-axis position, the vertical inclination of the workpiece is insufficiently corrected and the tool's attitude relative to the workpiece is inclined. As a consequence, stepped cutting marks are formed and the machining precision is decreased.

The invention provides a five-axis control machine tool that can correct an erroneous attitude of a workpiece toward a tool caused by the inclination of rotation axes of the five-axis control machine tool, and increase the machining precision.

SUMMARY OF THE INVENTION

In one aspect, the present invention discloses a control device of a five-axis control machine tool which allows a relative movement of a tool toward a workpiece by controlling five axes, which includes three linear axes and two rotation axes, based on NC data, the control device including a unit configured to store rotation-axis data including data of an axis direction and an axis position of each of the two rotation axes in association with a rotation angle of each of the two rotation axes obtained from the NC data, a unit configured to calculate a correction rotation angle of each of the two rotation axes, based on the rotation-axis data, to correct an attitude of the tool at the rotation angle, and a unit configured to correct the attitude of the tool by rotating each of the two rotation axes at the correction rotation angle.

Another aspect of the present invention discloses a control method of a five-axis control machine tool which allows relative movements of a tool and a workpiece by controlling five axes, which includes three linear axes and two rotation axes based on NC data, the control method including calculating a correction rotation angle of each of the two rotation axes based on rotation-axis data including data of an axis direction and an axis position of each of the two rotation axes in association with a rotation angle of each of the two rotation axes obtained from the NC data to correct an attitude of the workpiece toward the tool at the rotation angle, and correcting the attitude of the workpiece toward the tool by rotating each of the two rotation axes at the correction rotation angle.

Another aspect of the present invention discloses a program causing an NC device to actuate a five-axis control machine tool which allows relative movements of a tool and a workpiece by controlling five axes, which includes three linear axes and two rotation axes based on NC data, the program causing the NC device to execute calculating a correction rotation angle of each of the two rotation axes based on rotation-axis data including data of an axis direction and an axis position of each of the two rotation axes in association with a rotation angle of each of the two rotation axes obtained from the NC data to correct an attitude of the workpiece toward the tool at the rotation angle, and rotating each of the two rotation axes at the correction rotation angle.

Another aspect of the present invention discloses a mold machined by a five-axis control machine tool using the control device or the control method.

An erroneous attitude of the workpiece toward the tool, which may be caused by the inclination of the rotation axes of the five-axis control machine tool, can be reduced by correcting the rotation angle of each of the two rotation axes based on the NC data, and the machining precision can be increased.

Further features of the present invention will become apparent from the following description of exemplary embodiments with reference to the attached drawings.

BRIEF DESCRIPTION OF THE DRAWINGS

FIG. 12 is a flowchart illustrating a process performed by an NC-data correction rotation-angle calculation unit.

FIG. 15 illustrates graphs indicating unit vectors indicating the inclination of the X-Y plane, the inclination corresponding to the C-axis rotation angle.

DESCRIPTION OF THE EMBODIMENTS

Figure 1:
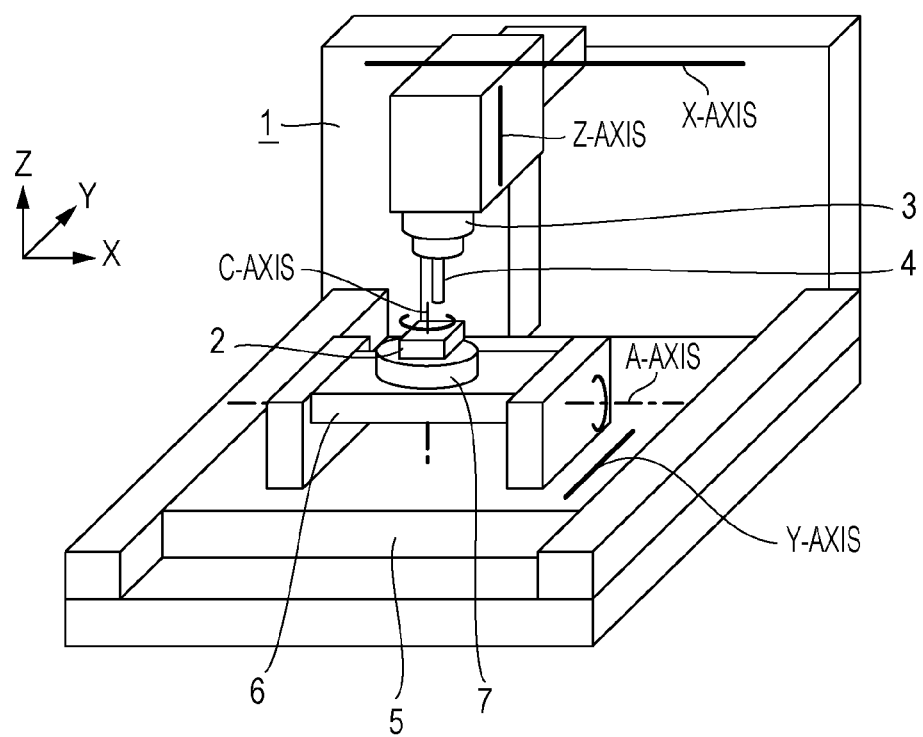
FIG. 1 illustrates the axis configuration of a five-axis control machine tool.

As illustrated in FIG. 1, a five-axis control machine tool 1 controls five axes including three linear axes X, Y, and Z, and two rotation axes A and C, where the linear axes cause a workpiece 2 and a main spindle 3 to move relatively in the directions of the three orthogonal axes. A tool 4 is installed on the main spindle 3, and the main spindle 3 is rotated to cut the workpiece 2. A tilting table 6 is provided on a Y-axis moving table 5, and the A-axis which is the rotation axis of the tilting table 6 is parallel to the linear axis X. Further, a rotating table 7 is provided on the tilting table 6, and the rotation axis C of the rotating table 7 is parallel to the linear axis Z when the rotation angle of the rotation axis A is 0°. The workpiece 2 is placed on the rotating table 7, and the tilting table 6 and the rotating table 7 are rotated about the rotation axes A and C at arbitrary angles, so that the workpiece 2 is inclined in arbitrary directions and machined.

It is desirable that the tilting table 6 is installed so that the rotation axis A thereof is parallel to the linear axis X and the rotating table 7 is installed so that the rotation axis C thereof is parallel to the linear axis Z. In actuality, however, the tilting table 6 and the rotating table 7 are often inclined in relation to reference linear axes due to the machining errors and installation errors thereof. Further, since the rotation axes have axial runouts, the directions of the rotation axes are changed in accordance with the rotation angle, which causes the machining errors.

Figure 2:
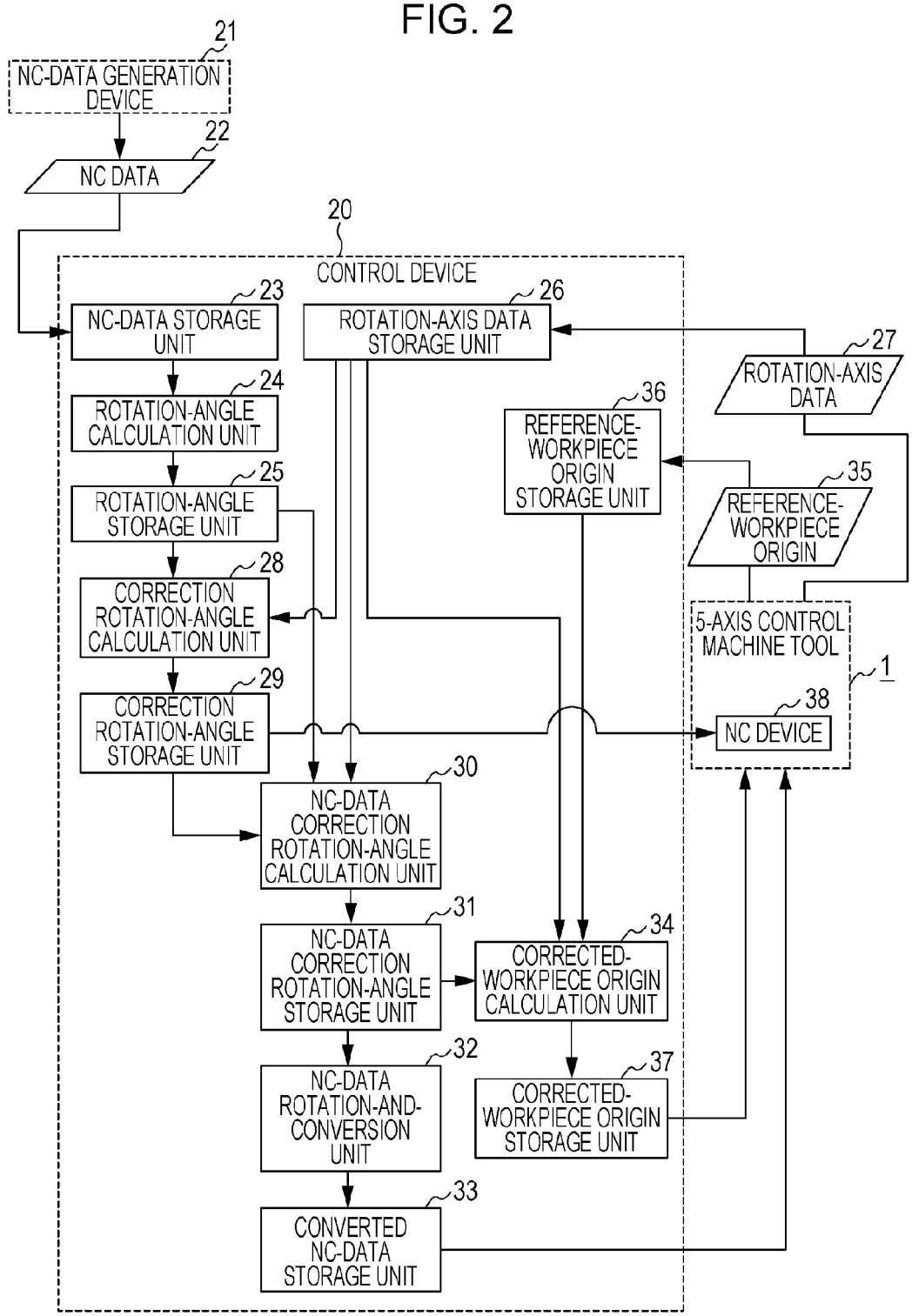
FIG. 2 is a block diagram illustrating the entire configuration of a control device of the five-axis control machine tool.

FIG. 2 illustrates the entire configuration of a control device 20 provided for the five-axis control machine tool 1. An NC-data generation device 21 generates NC data 22 that is used to control a machining operation performed by the five-axis control machine tool 1. The NC data 22 includes command data provided to operate the main spindle 3 of the five-axis control machine tool 1. The generated NC data 22 is stored in an NC-data storage unit 23. A rotation-angle calculation unit 24 calculates the rotation angles of the rotation axes A and C based on the stored NC data. Data of the calculated rotation angles of the rotation axes A and C is stored in a rotation-angle storage unit 25. On the other hand, a rotation-axis data storage unit 26 acquires and stores therein rotation-axis data 27 including data of the axis position and axis direction of each of the tilting table 6 and the rotating table 7 from the five-axis control machine tool 1. The rotation-axis data 27 will be described as below.

Figure 3:
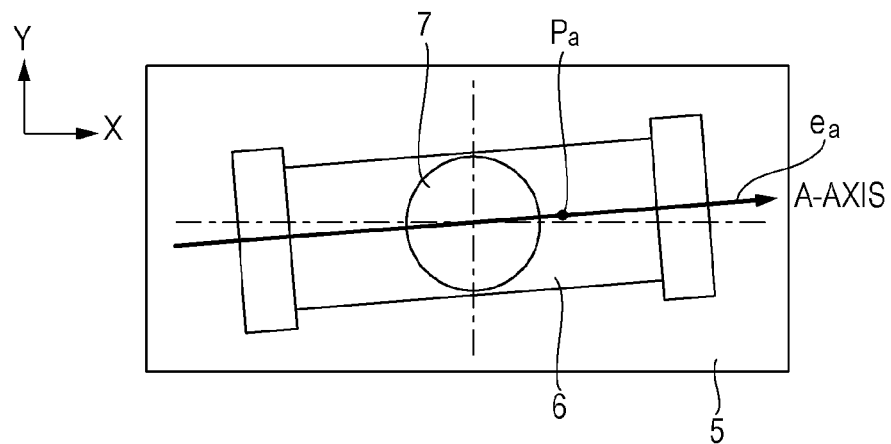
FIG. 3 is a plan view illustrating the inclination of a tilting table.
Figure 4:
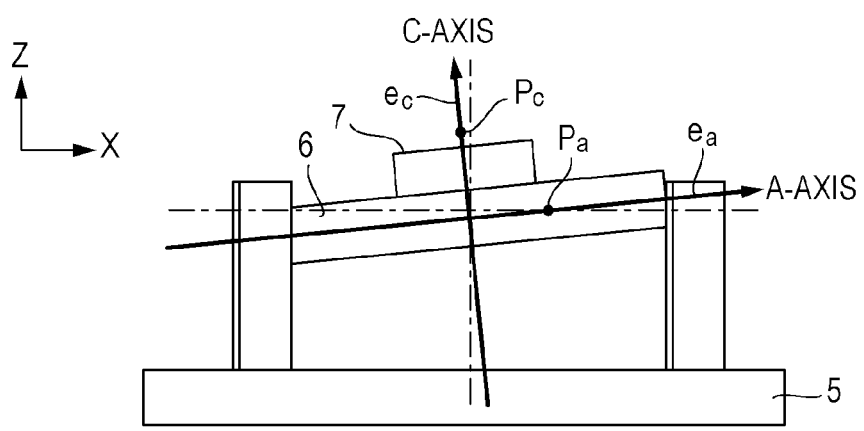
FIG. 4 is an elevational view illustrating the inclinations of the tilting table and a rotating table.

Ideally, the rotation axis A of the tilting table 6 is parallel to the linear axis X, and the direction of the rotation axis A may be expressed as the vector (1, 0, 0). However, the rotation axis A is inclined in actuality and is inclined in the X-Y plane and the X-Z plane as illustrated in FIGS. 3 and 4, respectively, for example. Therefore, the direction of the rotation axis A may not be expressed as the vector (1, 0, 0). The direction of the rotation axis A is expressed as a unit vector $e_a$. Since the rotation axis A has runouts, the unit vector $e_a$ is changed based on the rotation angle of the rotation axis A. The unit vector $e_a$ denotes the rotation-axis error of the rotation axis A. Here, an arbitrary single point on the rotation axis A is determined to be a point $P_a$. The position (axis position) and direction (axis direction) of the rotation axis A in the five-axis control machine tool 1 are defined based on the above-described two parameters.

Figure 5:
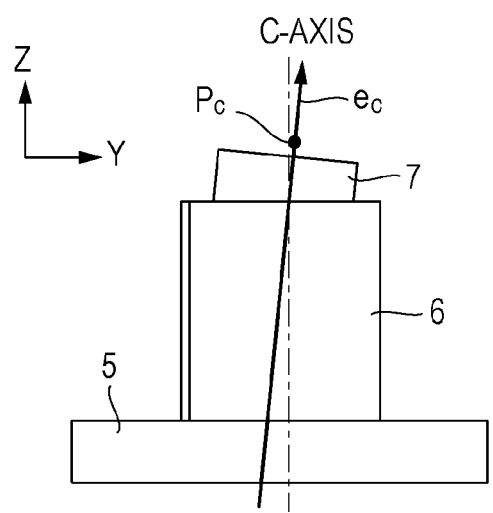
FIG. 5 is a side view illustrating the inclination of the rotating table.

Likewise, ideally the rotation axis C of the rotating table 7 is parallel to the linear axis Z when the rotation angle of the rotation axis A is 0°. Therefore, the direction of the rotation axis C may be expressed as the vector (0, 0, 1). However, when the rotation axis C is inclined in the X-Z plane and the Y-Z plane as illustrated in FIGS. 4 and 5, respectively, for example, the direction of the rotation axis C may not be expressed as the vector (0, 0, 1). The direction of the rotation axis C is expressed as a unit vector $e_c$. Since the rotation axis C has runouts, the unit vector $e_c$ is changed based on the rotation angle of the rotation axis C. The unit vector $e_c$ denotes the rotation-axis error of the rotation axis C. Further, an arbitrary single point on the rotation axis C is determined to be a point $P_c$. Consequently, the position (axis position) and direction (axis direction) of the rotation axis C in the five-axis control machine tool 1 are defined based on the above-described two parameters.

Figure 6A:
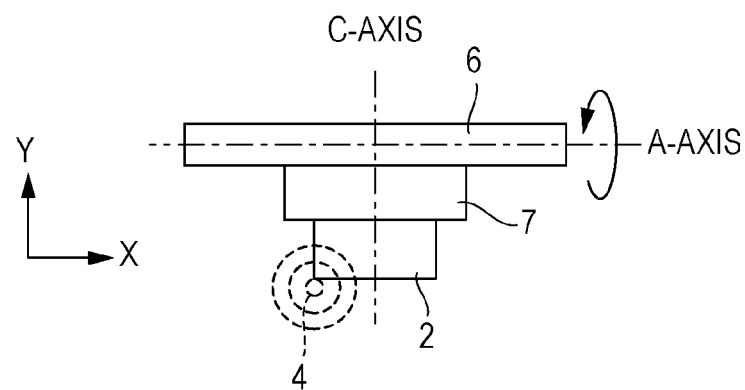
FIGS. 6A and 6B illustrate relative attitudes of a tool and a workpiece, when the rotation axes are not inclined.
Figure 6B:
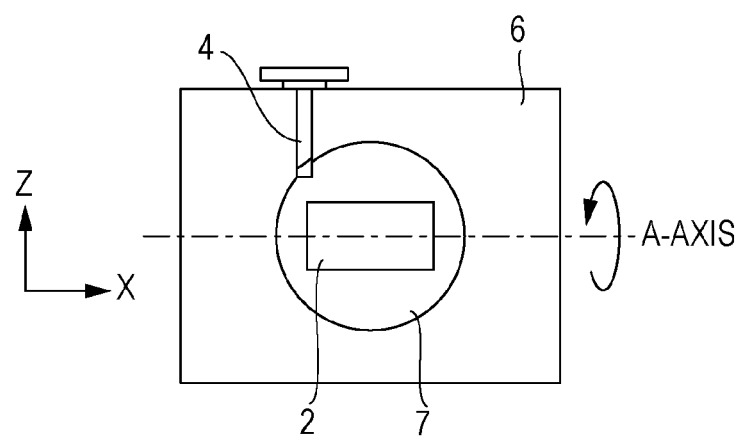
Figure 7A:
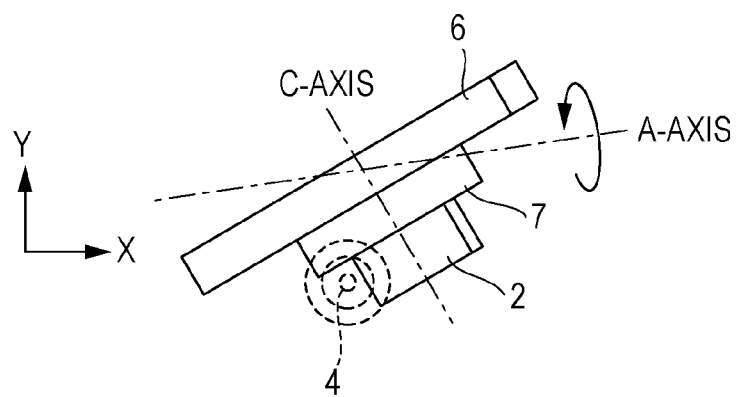
FIGS. 7A and 7B illustrate an erroneous attitude of the tool, when the rotation axes are inclined.
Figure 7B:
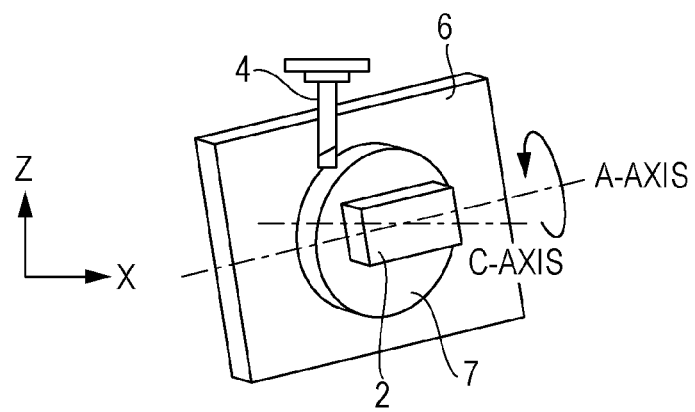

A correction rotation-angle calculation unit 28 illustrated in FIG. 2 calculates correction-rotation angles for the rotation angles of the rotation axes A and C stored in the rotation-angle storage unit 25 based on the rotation-axis data 27 of the rotation axes A and C stored in the rotation-axis data storage unit 26. Here, the correction-rotation angles will be described. FIGS. 6A and 6B illustrate an attitude of the tool 4 relative to the workpiece 2 when the rotation axes A and C are rotated at the rotation angles calculated by the rotation-angle calculation unit 24 such that the rotation axis A is not inclined with reference to its reference axis, that is, the linear axis X, and the rotation axis C is not inclined with reference to its reference axis, that is, the linear axis Z. On the other hand, when the rotation axes A and C are inclined with reference to the linear axes X and Z, attitude errors occur as illustrated in FIGS. 7A and 7B. The correction-rotation angles are calculated to rotate the rotation axes A and C for correction so that the relative attitudes of the tool 4 and the workpiece 2 that are installed in the five-axis control machine tool 1 agree with the relative attitudes of the tool 4 and the workpiece 2 that are attained when the rotation axes A and C are rotated without being inclined in relation to the reference axes.

Figure 8:
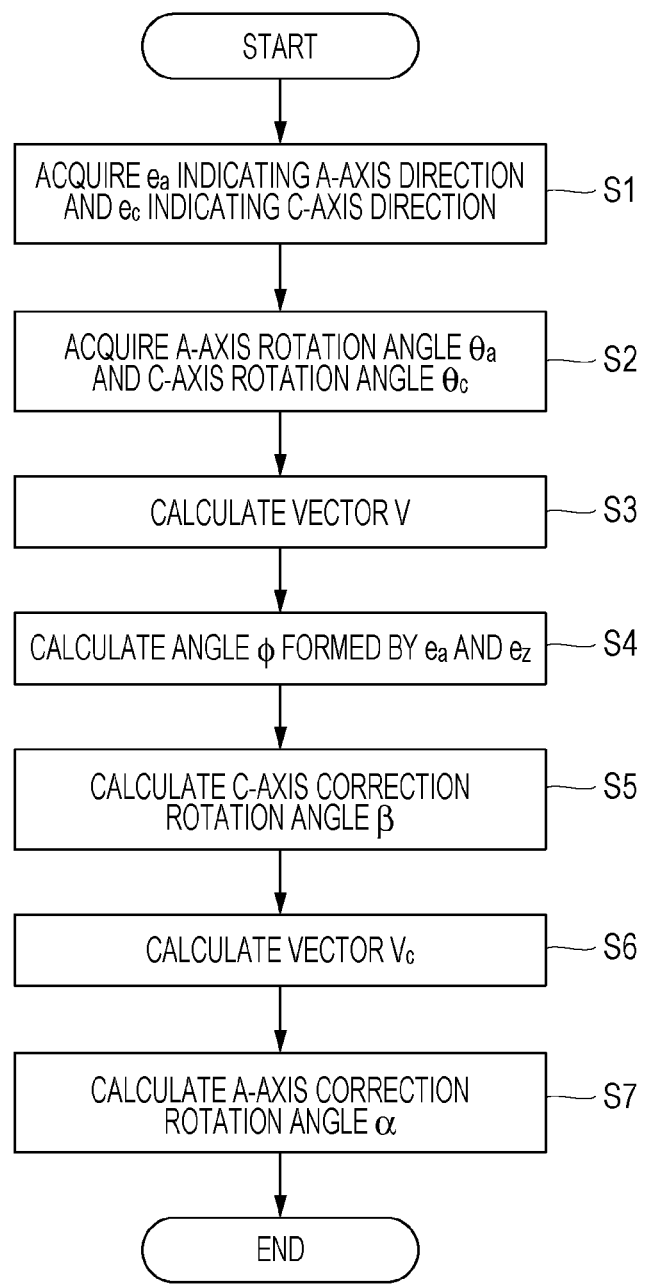
FIG. 8 is a flowchart illustrating a process performed by a correction rotation-angle calculation unit.

A process that is performed by the correction rotation-angle calculation unit 28 will be described with reference to a flowchart illustrated in FIG. 8. First, at step S1, data of the unit vectors $e_a$ and $e_c$ respectively indicating the directions of the rotation axes A and C is acquired from the rotation-axis data storage unit 26. Then, at step S2, data of the rotation angle $\theta_a$ of the rotation axis A and the rotation angle $\theta_c$ of the rotation axis C is acquired from the rotation-angle calculation unit 24.

Next, at step S3, the unit vector $e_z$ (0, 0, 1) indicating the direction in which the tool 4 is installed is rotated about the unit vector (1, 0, 0) indicating an appropriate direction of the rotation axis A by $-\theta_a$. Then, the unit vector $e_z$ (0, 0, 1) is further rotated about the unit vector (0, 0, 1) indicating an appropriate direction of the rotation axis C by $-\theta_c$ so that a unit vector V is calculated. The unit vector V indicates the direction in which the workpiece 2 is machined when the rotation angle of each of the rotation axes A and C is 0°. That is, the unit vector V indicates the travel direction of the tool 4.

At step S4, an angle $\phi$ formed by the unit vector $e_z$ (0, 0, 1) indicating the installation direction of the tool 4 and the unit vector $e_a$ indicating the direction of the rotation axis A is calculated. Then, at step S5, a rotation angle $\beta$ of the rotation axis C is calculated. When the rotation axis C is rotated at the rotation angle $\beta$ and the unit vector V calculated at step S3 is rotated about the unit vector $e_c$ indicating the direction of the rotation axis C, the unit vector V and the unit vector $e_a$ indicating the direction of the rotation axis A form the angle $\phi$. The rotation angle $\beta$ becomes a C-axis correction rotation angle.

Next, at step S6, the unit vector V calculated at step S3 is rotated about the unit vector $e_c$ indicating the direction of the rotation axis C at the rotation angle $\beta$ to calculate a unit vector $V_c$. Then, at step S7, a rotation angle $\alpha$ of the rotation axis A is calculated. When the rotation axis A is rotated at the rotation angle $\alpha$ and the unit vector $V_c$ calculated at step S6 is rotated about the unit vector $e_a$ indicating the direction of the rotation axis A, the unit vector $e_z$ (0, 0, 1) indicating the installation direction of the tool 4 is provided. The rotation angle $\alpha$ becomes an A-axis correction rotation angle. Namely, the tilting table 6 that has been inclined is rotated at the angle $\alpha$ and the rotating table 7 that has been inclined is rotated at the angle $\beta$.

Figure 9A:
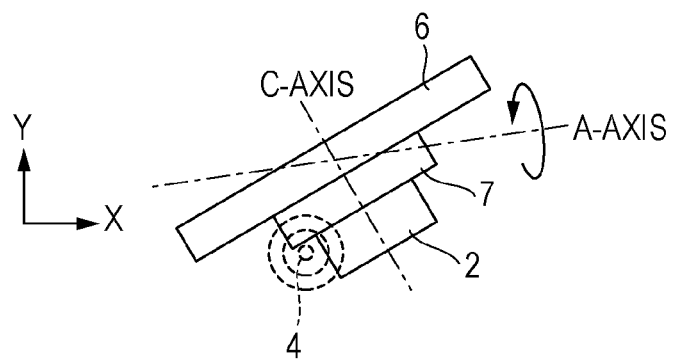
FIGS. 9A and 9B illustrate a method of correcting an erroneous attitude of the tool, when the rotation axes are inclined.
Figure 9B:
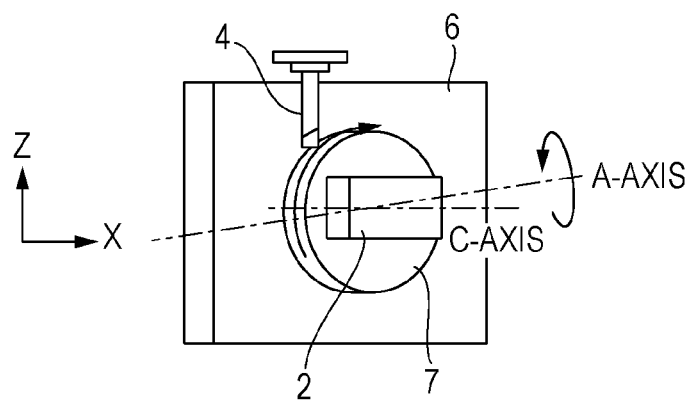

In that manner, as illustrated in FIGS. 9A and 9B, an attitude of the tool 4, which is erroneous in relation to the workpiece 2, is corrected so that the relative attitudes of the workpiece 2 and the tool 4 agree with those of the workpiece 2 and the tool 4, which are attained when the workpiece 2 is machined in the state where the two rotation axes are not inclined. Data of the A-axis correction rotation angle and the B-axis correction rotation angle that are calculated by the correction rotation-angle calculation unit 28 is stored in the correction rotation-angle storage unit 29.

Figure 10A:
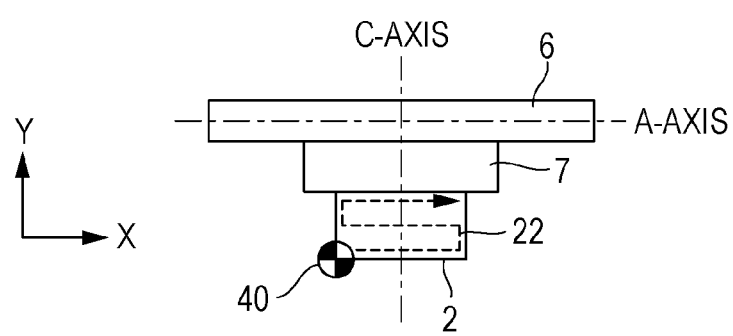
FIGS. 10A and 10B illustrate relative attitudes of NC data and the workpiece in the NC-data generation device.
Figure 10B:
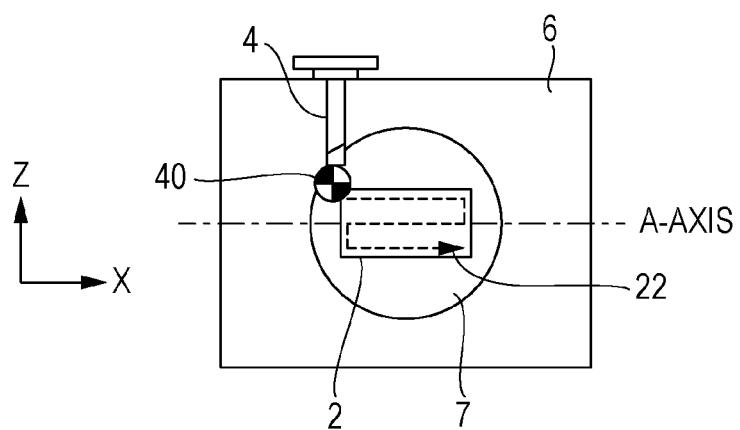
Figure 11A:
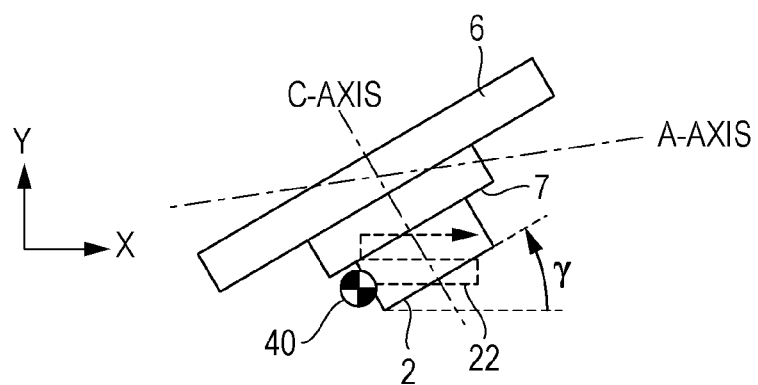
FIGS. 11A and 11B illustrate relative attitudes of the NC data and the workpiece, after correction rotation angles are applied.
Figure 11B:
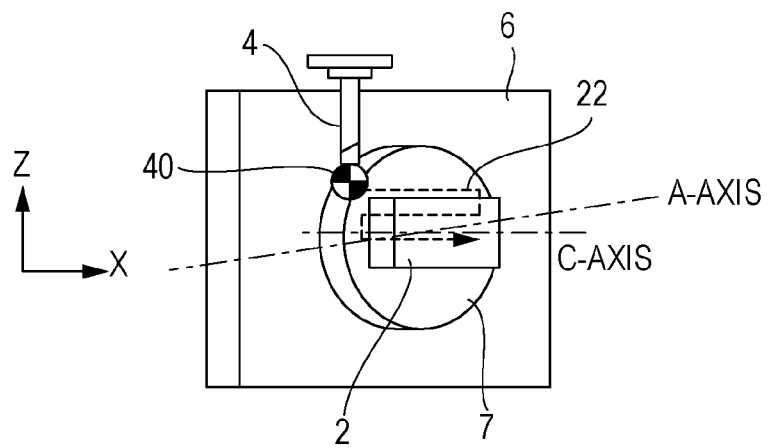

Next, an NC-data correction rotation-angle calculation unit 30 illustrated in FIG. 2 will be described. FIGS. 10A and 10B illustrate the relative attitudes of the NC data 22 and the workpiece 2, the NC data 22 being generated by the NC-data generation device 21 based on the premise that the two rotation axes are not inclined. When the rotation axes are inclined, the relative attitudes of the NC data 22 of the NC-data generation device 21 and the workpiece 2 placed on the five-axis control machine device 1 do not agree with each other as illustrated in FIGS. 11A and 11B. Therefore, it is desirable that the relative attitudes between the two agree with each other.

The NC data 22 is rotated about the unit vector $e_z$ (0, 0, 1) which is the installation direction of the tool 4 to correct the relative attitudes of the NC data 22 and the workpiece 2 to agree with each other. That is, the NC data 22 is rotated in the X-Y plane. Therefore, the NC-data correction rotation-angle calculation unit 30 calculates an NC-data correction rotation angle $\gamma$ to rotate the NC data 22 in the X-Y plane so that the relative attitudes of the NC data 22 of the NC-data generation device 21 and the workpiece 2 that is currently machined agree with each other.

A process that is performed by the NC-data correction rotation-angle calculation unit 30 will be described with reference to a flowchart illustrated in FIG. 12. First, at step S8, a unit vector $V'=(\cos\theta_c, -\sin\theta_c, 0)$ is calculated based on the rotation angle $\theta c$ of the rotation axis C, which is calculated by the rotation-angle calculation unit 24. Then, a unit vector $V_c'$ is calculated at step S9 by rotating the unit vector V' about the unit vector $e_c$ indicating the direction of the rotation axis C at the rotation angle $\beta$.

Next, a unit vector $V_a'$ is calculated at step S10 by rotating the unit vector $V_c'$ about the unit vector $e_a$ indicating the direction of the rotation axis A at the rotation angle $\alpha$. Finally, at step S11, the arccosine function of an X component of the unit vector $V_a'$ calculated at step S10 is calculated. An angle $\gamma$ obtained by calculating the arccosine function based on the X component of the unit vector $V_a'$ becomes the NC-data correction rotation angle.

As illustrated in FIG. 2, data of the NC-data correction rotation angle $\gamma$ calculated by the NC-data correction rotation-angle calculation unit 30 is stored in an NC-data correction rotation-angle storage unit 31. Then, an NC-data rotation-and-conversion unit 32 rotates the NC data 22 stored in the NC-data storage unit 23 about the unit vector $e_z$ (0, 0, 1) indicating the installation direction of the tool 4 based on the NC-data correction rotation angle so that the NC data 22 is converted into converted NC data.

Figure 13A:
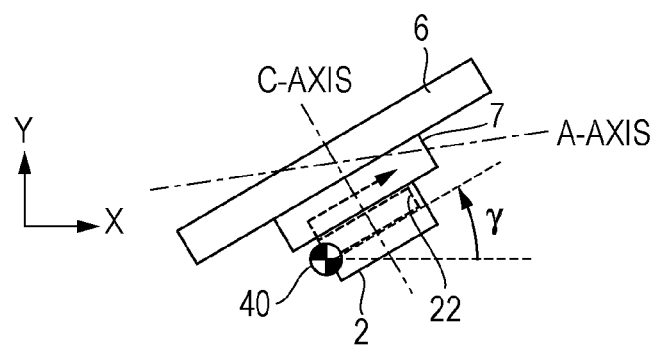
FIGS. 13A and 13B illustrate relative attitudes of converted NC data and the workpiece.
Figure 13B:
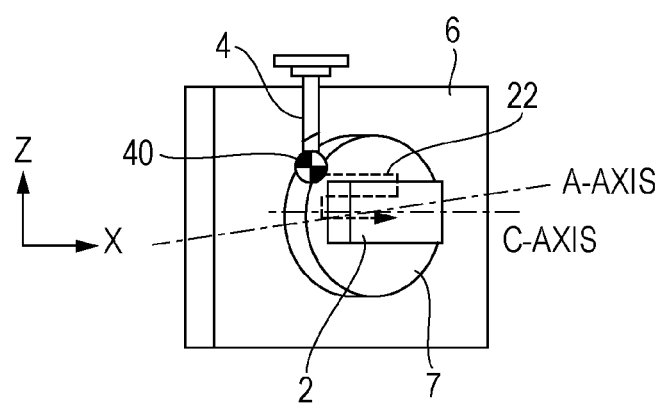

As illustrated in FIGS. 13A and 13B, the rotation and conversion of the NC data 22 cause the relative attitudes of the converted NC data and the workpiece 2 to agree with those of the NC data 22 and the workpiece 2 of the NC-data generation device 21, which are illustrated in FIGS. 10A and 10B. Namely, the process through steps S1 to S11 causes relative attitudes of the three, that is, the tool 4, the workpiece 2, and the converted NC data of the five-axis control machine tool 1 to agree with those of the tool 4, the workpiece 2, and the NC data 22 of the NC-data generation device 21. The converted NC data converted by the NC-data rotation-and-conversion unit 32 is input to and stored in the converted NC-data storage unit 33.

The above-described process allows relative attitudes of the three, that is, the tool, the workpiece, and the NC data of the five-axis control machine tool 1 to agree with those of the NC-data generation device 21. However, the relative positions of the tool, the workpiece, and the NC data of the five-axis control machine tool 1 do not agree with those of the NC-data generation device 21. That is, it is desirable that not only the relative attitudes, but also the relative positions agree with one another in consideration of the machining precision. However, of the three, the position of the tool 4 is determined based on the NC data 22. Therefore, it is desirable in actuality that the relative positions of the workpiece and the NC data agree with one another. A corrected-workpiece origin calculation unit 34 is provided to cause the relative positions of the workpiece and the NC data to agree with one another.

Next, the corrected-workpiece origin calculation unit 34 illustrated in FIG. 2 will be described. First, the origin of the workpiece 2 placed on the five-axis control machine tool 1 is obtained at the rotation angle of each of the rotation axes A and C is 0° before the machining is started. Rotation angles at that time are determined to be reference rotation angles. Here, the origin of the workpiece 2, which is obtained when the rotation angle of the rotation axis A of the tilting table 6 is 0° and that of the rotation axis C of the rotating table 7 is 0°, is determined to be a reference-work origin 35. Data of the obtained reference workpiece origin 35 is input to and stored in a reference-workpiece origin storage unit 36 of the control device 20.

Figure 14:
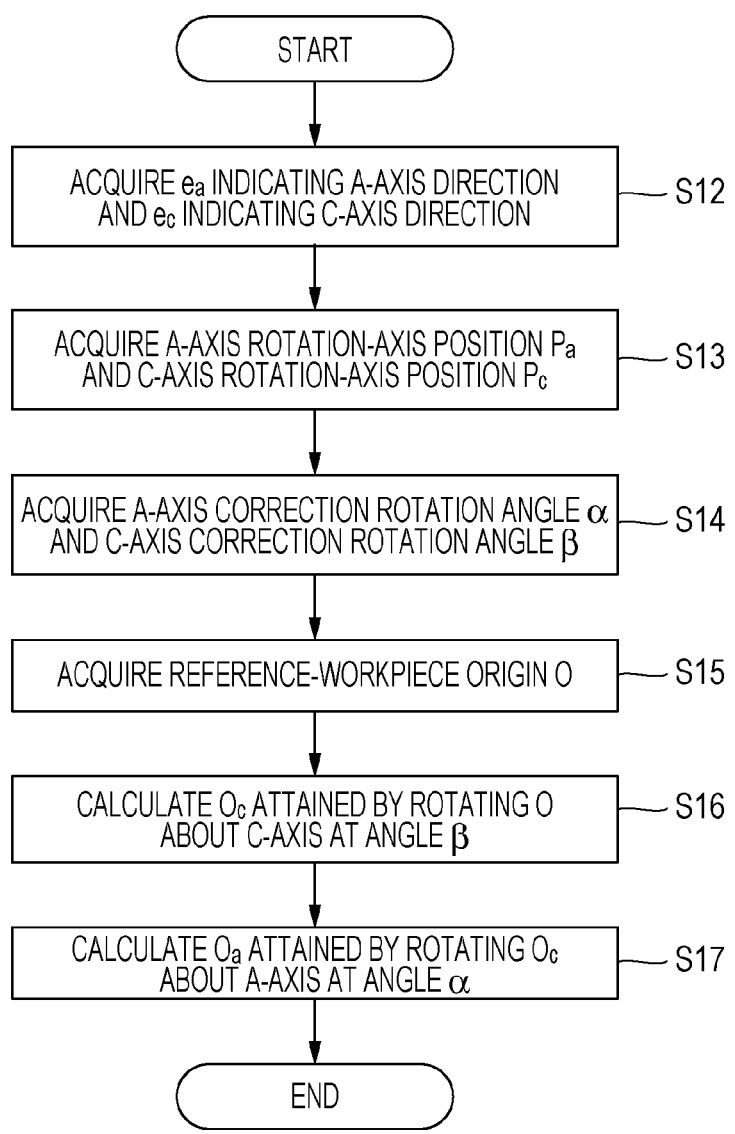
FIG. 14 is a flowchart illustrating a process performed by a corrected-workpiece origin calculation unit.

The corrected-workpiece origin calculation unit 34 calculates a corrected workpiece origin such that the deviation of the reference workpiece origin 35 is corrected by using the rotation-axis data storage unit 26, the correction rotation-angle calculation unit 28, and the data of the reference-workpiece origin 35 stored in the reference-workpiece origin storage unit 36. A process that is performed by the corrected-workpiece origin calculation unit 34 will be described with reference to a flowchart illustrated in FIG. 14.

First, at step S12, data of the unit vector $e_a$ indicating the direction of the rotation axis A and the unit vector $e_c$ indicating the direction of the rotation axis C is acquired from the rotation-axis data storage unit 26. Next, at step S13, the data of an arbitrary point $P_a$ on the rotation axis A and an arbitrary point $P_c$ on the rotation axis C is acquired from the rotation-axis data storage unit 26. The position and direction of the rotation axis A, which are defined in a machine coordinate system of the five-axis control machine tool 1, may be expressed based on the unit vector $e_a$ and the point $P_a$. Likewise, the position and direction of the rotation axis C, which are defined in the machine coordinate system of the five-axis control machine tool 1, may be expressed based on the unit vector $e_c$ and the point $P_c$.

Further, at step S14, the data of the A-axis correction rotation angle $\alpha$ and the C-axis correction rotation angle $\beta$ that are calculated by the correction rotation-angle calculation unit 28 is acquired. Still further, at step S15, the data of the reference-workpiece origin 35 is acquired from the reference-workpiece origin storage unit 36. Here, a point O is determined to be the reference-workpiece origin. Then, a point $O_c$ is calculated at step S16. The point $O_c$ is obtained by rotating the reference-workpiece origin O about the rotation axis C expressed based on the unit vector $e_c$ and the point $P_c$ at the angle $\beta$.

Next, a point $O_a$ is calculated at step S17. The point $O_a$ is obtained by rotating the point $O_c$ about the rotation axis A expressed based on the unit vector $e_a$ and the point $P_a$ at the angle $\alpha$. The point $O_a$ becomes the origin of the workpiece 2 when the rotation axis A is rotated at the correction rotation angle from 0° and the rotation axis C is rotated at the correction rotation angle from 0°. The above-described origin of the workpiece 2 is determined to be a corrected workpiece origin which becomes the position of the origin of the converted NC data in the five-axis control machine tool 1.

The process performed by the corrected-workpiece origin calculation unit 34 causes the relative position of the workpiece origin defining the positions of the workpiece and the NC data in the five-axis control machine tool 1 to agree with that of the workpiece origin defining the positions of the workpiece and the NC data in the NC-data generation device 21.

Data of the corrected workpiece origin calculated by the corrected-workpiece origin calculation unit 34 is stored in a corrected-workpiece origin storage unit 37.

When the machining is started using the five-axis control machine tool 1, data of the corrected workpiece origin $O_a$ is output from the corrected-workpiece origin storage unit 37 and data of the correction rotation angles $\alpha$ and $\beta$ is output from the correction rotation-angle storage unit 29 in the control device 20. The above-described data is input to an NC device 38. Next, the converted NC data obtained by rotating the NC data at the angle $\gamma$ for conversion is transmitted from the converted NC-data storage unit 33 to the NC device 38. Then, the NC device 38 outputs instruction data to the operation controller of each axis to control the five axes including the three linear axes and the two rotation axes. The five-axis control allows the relative movement of the tool-tip position 40 so that the workpiece 2 is machined. According to the above-described configurations, machining errors caused by the inclined rotation axes are reduced and machining with high precision is achieved.

The processing operations of the above-described embodiments are executed by a computer system or apparatus. Therefore, functions of the above-described embodiments can also be achieved by supplying a storage medium storing a software program for implementing the above-described functions to the system or apparatus so that a computer (CPU, MPU, etc.) of the system or apparatus reads and executes the program stored in the storage medium.

In that case, the program read from the storage medium, achieves the functions of the above-described embodiments, and thus the present invention includes the program and the storage medium storing the program. The storage medium for providing the program may be, for example, a flexible disk, a hard disk, an optical disk, a magneto-optical disk, a CD-ROM, a CD-R, a magnetic tape, a non-volatile memory card, a ROM, etc.

Further, a mold is machined by using a five-axis control machine tool controlled by a control device and a control method according to an embodiment of the present invention, for example. Since the attitudes of a workpiece and a tool can be corrected by using the above-described control device and control method, it is possible to reduce the degradation of the surface accuracy, which is caused by stepped cutting marks due to the machining.

Embodiments

As illustrated in FIG. 2, the NC data 22 generated by the NC-data generation device 21 is input to and stored in the NC-data storage unit 23 of the control device 20. The rotation-angle calculation unit 24 calculates the rotation angles of the rotation axes A and C based on the stored NC data 22. Data of the calculated rotation angles is stored in the rotation-angle storage unit 25.

On the other hand, the rotation-axis data storage unit 26 stores the rotation-axis data 27, in relation to the stored rotation-angle data, of the tilting table 6 and the rotating table 7 of the five-axis control machine tool 1. Here, the rotation-axis data 27 will be described. FIG. 15 illustrates the result of measuring the unit vector $e_{xy}$ (X, Y, Z) of a plane obtained by rotating the plane (0, 0, 1) about the rotation axis C when the rotation angle of each of the rotation axes A and C is 0°, where a graph 41 indicates a vector in the X direction and a graph 42 indicates a vector in the Y direction. The measurement result illustrated in FIG. 15 is subjected to regression analysis so that the following relational expression is obtained.

$$X=(9.75E-06)*\sin(\theta_c+53.5)-(8.43E-06)$$

$$Y=(2.03E-05)*\sin(\theta_c-31)-(2.38E-06) \qquad \text{[Expression 1]}$$

Data of the above-described relational expressions is set as the rotation-axis data 27, and the inclination of the plane, which is attained when the rotation axis C is rotated at the rotation angle $\theta_c$, is calculated. The data of the rotation angle $\theta_c$ is stored in the rotation-angle storage unit 25. Then, the unit vector $e_c$ that indicates the direction of the rotation axis C and does not cause the calculated inclination of the plane when the rotation axis C is rotated at the rotation angle $\theta_c$ is calculated. The unit vector $e_a$ indicating the direction of the rotation axis A is calculated as is the case with the rotation axis C.

The correction rotation-angle calculation unit 28 calculates the correction-rotation angles of the rotation axes A and C based on the rotation-axis data 27 of the rotation axes A and C, the data 27 being stored in the rotation-axis data storage unit 26, and relational expressions that are provided based on the data of the rotation angles of the rotation axes A and C, the data being stored in the rotation-angle storage unit 25. Hereinafter, the procedure for calculating the correction rotation angles will be described. First, the vector V is calculated according to the following relational expression:

$$\begin{pmatrix} Vx \\ Vy \\ Vz \end{pmatrix} = \begin{pmatrix} M\theta_c^{-1} \end{pmatrix} \begin{pmatrix} M\theta_a^{-1} \end{pmatrix} \begin{pmatrix} Z \end{pmatrix}$$ [Expression 2]

where (Vx, Vy, Vz) is the vector V,
$M\theta_c^{-1}$ is a $-\theta_c$ rotation matrix,
$M\theta_a^{-1}$ is a $-\theta_a$ rotation matrix, and
Z is a Z vector.

Next, the angle $\phi$ formed by the unit vector $e_z$ (0, 0, 1) and the unit vector $e_a$ indicating the direction of the rotation axis A is calculated in accordance with the following relational expression:

$$\Phi = \cos^{-1}(e_{az})$$ [Expression 3]

where $e_{az}$ is a Z component of the unit vector $e_a$.

Then, the C-axis correction rotation angle β is calculated based on the inner product formula as below:

$$V_c \cdot e_a = |Vc| \, |e_a| \cos \Phi$$ [Expression 4]

Next, the vector Vc is calculated in accordance with the following relational expression:

$$\begin{pmatrix} Vc \end{pmatrix} = \begin{pmatrix} Rc \end{pmatrix} \begin{pmatrix} V \end{pmatrix}$$ [Expression 5]

where Vc is the vector Vc,
Rc is a rotation matrix rotated β° about the unit vector $e_c$, and
V is the vector V.

Then, the A-axis correction rotation angle α is calculated in accordance with the following relational expression:

$$\begin{pmatrix} Ra \end{pmatrix} \begin{pmatrix} Rc \end{pmatrix} \begin{pmatrix} V \end{pmatrix} = \begin{pmatrix} 0 \\ 0 \\ 1 \end{pmatrix}$$ [Expression 6]

where Ra is a rotation matrix rotated α° about the unit vector $e_a$,
Rc is a rotation matrix rotated β° about the unit vector $e_c$, and
V is the vector V.

The data of the calculated correction rotation angles of the rotation axes A and C is stored in the correction rotation-angle storage unit 29.

Next, the procedure for calculating the NC-data correction rotation angle γ by the NC-data correction rotation-angle calculation unit 30 will be described. The unit vector V'a is calculated in accordance with the following relational expression:

$$\begin{pmatrix} V'ax \\ V'ay \\ V'az \end{pmatrix} = \begin{pmatrix} Ra \end{pmatrix} \begin{pmatrix} Rc \end{pmatrix} \begin{pmatrix} M\theta_c \end{pmatrix}$$ [Expression 7]

where (V'ax, V'ay, V'az) is the vector V'a,
Ra is a rotation matrix R rotated α° about the unit vector $e_a$,
c is a rotation matrix Mθ rotated β° about the unit vector $e_c$, and
c is a $\theta_c$ rotation matrix.

The NC-data correction rotation angle γ is calculated in accordance with the following relational expression:

$$\gamma = \cos^{-1}(V'ax)$$ [Expression 8]

The converted NC data is obtained by the rotation conversion based on the calculated NC-data correction rotation angles. The above-described process causes the relative attitudes of the tool, the workpiece, and the NC data of the five-axis control machine tool 1 to agree with those of the tool, the workpiece, and the NC data of the NC-data generation device 21.

Next, the corrected-workpiece origin calculation unit 34 will be described. The corrected-workpiece origin calculation unit 34 calculates the corrected workpiece origin by using the rotation-axis data storage unit 26, the correction rotation-angle calculation unit 28, and the data of the reference-workpiece origin 35 stored in the reference-workpiece origin storage unit 36. Hereinafter, the procedure for calculating the corrected workpiece origin will be described.

A point Oc obtained by rotating the reference-workpiece origin O about the rotation axis C at the angle β is calculated in accordance with the following relational expression:

$$\begin{pmatrix} Oc \end{pmatrix} = \begin{pmatrix} Rc' \end{pmatrix} \begin{pmatrix} O \end{pmatrix}$$ [Expression 9]

where Rc' is a rotation matrix rotated β° about the unit vector $e_c$ passing through the point $P_c$.

Next, a point Oa obtained by rotating the point Oc about the rotation axis A at the angle α is calculated in accordance with the following relational expression:

$$\begin{pmatrix} Oa \end{pmatrix} = \begin{pmatrix} Ra' \end{pmatrix} \begin{pmatrix} Oc \end{pmatrix}$$ [Expression 10]

where Ra' is a rotation matrix rotated α° about the unit vector $e_a$ passing through the point $P_a$.

The calculated point Oa becomes a corrected workpiece origin obtained when the rotation axes A and C are rotated from 0° at the correction rotation angles.

The above-described process causes the relative positions of the workpiece and the NC data in the five-axis control machine tool 1 to agree with relative positions that are attained when the two rotation axes A and C are not inclined with reference to their reference axes.

As a consequence, the relative positions and attitudes of the workpiece 2 and the tool 4 in the five-axis control machine tool 1 agree with those attained when the two rotation axes A and C are not inclined with reference to their reference axes, so that the workpiece 2 is machined with high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-009538 filed Jan. 20, 2011, which is hereby incorporated by reference herein in its entirety.

What is claimed is:

1. A control device of a five-axis control machine tool which allows a relative movement of a tool and a workpiece by controlling five axes, which includes three linear axes and two rotation axes, based on NC data, the control device comprising:
   a unit configured to store rotation-axis data including data of an axis direction of each of the two rotation axes in association with a rotation angle of each of the two rotation axes;
   a unit configured to calculate a correction rotation angle of one of the two rotation axes and a correction rotation angle of another of the two rotation axes, based on the rotation-axis data; and
   a unit configured to correct the attitude of the tool by rotating each of the two rotation axes at the correction rotation angles,
   wherein the correction rotation angle of the one of the two rotation axes is a rotation angle $\beta$ at which an angle $\gamma$ formed by an axis direction of the other of the two rotation axes and an installation direction of the tool is equal to an angle formed by an axis direction of the one of the two rotation axes and the axis direction of the other of the two rotation axes, and the correction rotation angle of the other of the two rotation axes is a rotation angle $\alpha$ formed by the axis direction of the one of the two rotation axes and the installation direction of the tool when the rotation axis of the one of the two rotation axes is rotated by the rotation angle $\beta$.

2. The control device of the five-axis control machine tool according to claim 1, further comprising:
   an NC-data rotation-and-conversion unit configured to rotate and convert the NC data in association with the correction rotation angles to obtain converted NC data; and
   a unit configured to control the three linear axes and the two rotation axes based on the converted NC data.

3. The control device of the five-axis control machine tool according to claim 2, further comprising:
   a workpiece-origin storage unit configured to store data of an origin position of the workpiece, the origin position being determined based on the NC data;
   a unit configured to calculate a corrected workpiece origin obtained by correcting a deviation of the origin position of the workpiece, the deviation occurring when each of the two rotation axes is rotated at the correction rotation angles based on the rotation-axis data of the two rotation axes; and
   a unit configured to control the three linear axes and the two rotation axes based on the corrected workpiece origin and the converted NC data.

4. A control method of a five-axis control machine tool which causes relative movements of a tool and a workpiece by controlling five axes, which includes three linear axes and two rotation axes based on NC data, the control method comprising:
   calculating a correction rotation angle of one of the two rotation axes and a correction rotation angle of another of the two rotation axes based on rotation-axis data including data of an axis direction of each of the two rotation axes in association with a rotation angle of each of the two rotation axes; and
   correcting the attitude of the workpiece toward the tool by rotating each of the two rotation axes at the correction rotation angles,
   wherein the correction rotation angle of the one of the two rotation axes is a rotation angle $\alpha$ at which an angle $\gamma$ formed by an axis direction of the other of the two rotation axes and an installation direction of the tool is equal to an angle formed by an axis direction of the one of the two rotation axes and the axis direction of the other of the two rotation axes, and the correction rotation angle of the other of the two rotation axes is a rotation angle $\alpha$ formed by the axis direction of the one of the two rotation axes and the installation direction of the tool when the rotation axis of the one of the two rotation axes is rotated by the rotation angle $\beta$.

5. The control method of the five-axis control machine tool according to claim 4, further comprising controlling the three linear axes and the two rotation axes based on converted NC data obtained by rotating and converting the NC data in association with the correction rotation angles.

6. The control method of the five-axis control machine tool according to claim 5, further comprising:
   calculating a corrected workpiece origin obtained by correcting a deviation of a origin position of the workpiece based on the NC data, the deviation occurring when each of the two rotation axes is rotated at the correction rotation angles based on the rotation-axis data of the two rotation axes; and
   controlling the three linear axes and the two rotation axes based on the corrected workpiece origin and the converted NC data.

7. A method causing an NC device to actuate a five-axis control machine tool which allows relative movements of a tool and a workpiece by controlling five axes, which includes three linear axes and two rotation axes, based on NC data, the method comprising:
   causing the NC device to execute to calculate a correction rotation angle of one of the two rotation axes and a correction rotation angle of another of the two rotation axes based on rotation-axis data including data of an axis direction of each of the two rotation axes in association with a rotation angle of each of the two rotation axes; and
   causing the NC device to execute to rotate each of the two rotation axes at the correction rotation angles,
   wherein the correction rotation angle of the one of the two rotation axes is a rotation angle $\beta$ at which an angle $\gamma$ formed by an axis direction of the other of the two rotation axes and an installation direction of the tool is equal to an angle formed by an axis direction of the one of the two rotation axes and the axis direction of the other of the two rotation axes, and the correction rotation angle of the other of the two rotation axes is a rotation angle $\alpha$ formed by the axis direction of the one of the two rotation axes and the installation direction of the tool when the rotation axis of the one of the two rotation axes is rotated by the rotation angle $\beta$.

8. An system causing an NC device to actuate a five-axis control machine tool which allows relative movements of a tool and a workpiece by controlling five axes, which includes three linear axes and two rotation axes, based on NC data, the system comprising:
   unit configured to cause the NC device to execute to calculate a correction rotation angle of one of the two rotation axes and a correction rotation angle of another of the two rotation axes based on rotation-axis data including data of an axis direction of each of the two rotation axes in association with a rotation angle of each of the two rotation axes; and unit configured to cause the NC device to execute to rotate each of the two rotation axes at the correction rotation angle, wherein the correction rotation angle of the one of the two rotation axes is a rotation angle $\beta$ at which an angle $\gamma$ formed by an axis direction of the other of the two rotation axes and an installation direction of the tool is equal to an angle formed by an axis direction of the one of the two rotation axes and the axis direction of the other of the two rotation axes, and the correction rotation angle of the other of the two rotation axes is a rotation angle $\alpha$ formed by the axis direction of the one of the two rotation axes and the installation direction of the tool when the rotation axis of the one of the two rotation axes is rotated by the rotation angle $\beta$.

9. A mold machined by a five-axis control machine tool using the control device according to claim 1 or the control method according to claim 4.

* * * * *